(12) United States Patent
Wu (10) Patent No.: US 11,667,316 B2
(45) Date of Patent: Jun. 6, 2023

(54) INFANT CARRIER AND BACKREST ADJUSTING MECHANISM THEREOF

(71) Applicant: Wonderland Switzerland AG, Steinhausen (CH)

(72) Inventor: HaiTao Wu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 132 days.

(21) Appl. No.: 16/907,181

(22) Filed: Jun. 20, 2020

(65) Prior Publication Data

US 2020/0406950 A1 Dec. 31, 2020

(30) Foreign Application Priority Data

Jun. 28, 2019 (CN) .......................... 201910576475.8

(51) Int. Cl.
| | |
|---|---|
| *B62B 9/10* | (2006.01) |
| *A47D 13/02* | (2006.01) |
| *B60N 2/28* | (2006.01) |
| *B62B 7/04* | (2006.01) |
| *A47D 1/00* | (2006.01) |

(52) U.S. Cl.
CPC .............. *B62B 9/104* (2013.01); *A47D 1/002* (2013.01); *A47D 13/025* (2013.01); *B60N 2/2848* (2013.01); *B62B 7/04* (2013.01)

(58) Field of Classification Search
CPC .. B60N 2/2848; B60N 2/2878; B60N 2/2875; B62B 9/104; A47D 13/025
See application file for complete search history.

(56) References Cited

U.S. PATENT DOCUMENTS

| 4,834,403 A | * | 5/1989 | Yanus | ...................... B62B 7/12 |
| | | | | 280/30 |
| 9,962,011 B1 | | 5/2018 | Eyman | |
| 2016/0046314 A1 | * | 2/2016 | Zehfuss | .................. B62B 9/104 |
| | | | | 297/354.12 |

FOREIGN PATENT DOCUMENTS

| CN | 107082083 A | * | 8/2017 | |
| CN | 108556896 A | * | 9/2018 | |
| CN | 110282000 A | * | 9/2019 | |
| CN | 113044101 A | * | 6/2021 | |
| CN | 113147879 A | * | 7/2021 | |
| DE | 20202272 U1 | * | 7/2002 | ............. B62B 7/064 |
| DE | 202017106245 U1 | * | 12/2017 | ............... A47C 4/00 |
| EP | 1 847 438 A2 | | 10/2007 | |
| EP | 2 965 969 A1 | | 1/2016 | |

(Continued)

*Primary Examiner* — Timothy J Brindley
(74) *Attorney, Agent, or Firm* — Winston Hsu (57) ABSTRACT

A backrest adjusting mechanism disposed between a backrest tube and a frame of an infant carrier is disclosed. The backrest adjusting mechanism includes an outer cover, an inner cover, a driving member, a locking member, and an operating member. The outer cover is fixed at the frame. The inner cover is connected to the backrest tube and pivoted to the outer cover via a pivot shaft. The driving member is movably disposed between the outer cover and the inner cover. The locking member is movably disposed on the driving member. The operating member is connected to the driving member for driving the driving member to move between a first position and a second position. Switching of the driving member between the first position and the second position drives the locking member to selectively lock or release the outer cover and the inner cover.

20 Claims, 9 Drawing Sheets

(56) References Cited

FOREIGN PATENT DOCUMENTS

| EP | 2 336 000 B1 | 9/2016 | |
|----|----|----|----|
| GB | 2 432 345 A | 5/2007 | |
| GB | 2 449 999 A | 12/2008 | |
| WO | WO-2010110831 A1 * | 9/2010 | ............... B62B 7/08 |

* cited by examiner

INFANT CARRIER AND BACKREST ADJUSTING MECHANISM THEREOF

BACKGROUND OF THE INVENTION

1. Field of the Invention

The present invention relates to an infant carrier and a backrest adjusting mechanism thereof, and more specifically, to an infant carrier having a backrest adjusting function and a backrest adjusting mechanism thereof.

2. Description of the Prior Art

Rapid developed economics and technology provide people with various consumer products, such as an infant carrier. The infant carrier not only allows an adult to operate it with one hand to reduce his burden when taking an infant out, but also makes the infant sit thereon comfortably. Thus, the infant carrier has become more and more popular in infant caring. With improvement of user demand for the infant carrier, the infant carrier design has been made progress for satisfying the user needs.

However, the infant carrier commonly seen in the prior art does not have a backrest adjusting mechanism mounted thereon, meaning that a backrest of the infant carrier cannot be adjusted according to the user needs. As such, an infant may feel uncomfortable easily since he needs to hold a posture for a long period of time. Thus, it is necessary to design an infant carrier which has a simple mechanical design and is easy to operate and a backrest adjusting mechanism thereof to solve the aforesaid problems.

SUMMARY OF THE INVENTION

One purpose of the present invention is to provide a backrest adjusting mechanism which has a simple mechanical design and is easy to operate.

Another purpose of the present invention is to provide an infant carrier which has a simple mechanical design and is easy to operate.

For achieving the aforesaid purposes, a backrest adjusting mechanism of the present invention is disposed between a backrest tube and a frame of an infant carrier. The backrest adjusting mechanism of the present invention includes an outer cover, an inner cover, a driving member, a locking member, and an operating member. The outer cover is fixed at the frame. The inner cover is connected to the backrest tube and pivoted to the outer cover via a pivot shaft. The driving member is movably disposed between the outer cover and the inner cover. The locking member is movably disposed on the driving member. The operating member is connected to the driving member for driving the driving member to move between a first position and a second position. Switching of the driving member between the first position and the second position drives the locking member to selectively lock or release the outer cover and the inner cover.

Preferably, an accommodating cavity is formed on the outer cover and has an opening facing inward, the inner cover covers the opening, and the driving member is located in the accommodating cavity.

Preferably, the driving member is pivoted to the pivot shaft.

Preferably, at least two first locking portions are disposed on the outer cover, at least one second locking portion is disposed on the inner cover, and the locking member is cooperated with the at least one second locking portion and selectively cooperated with one of the at least two first locking portions.

Preferably, the backrest adjusting mechanism further includes a pulling member, a first end of the pulling member is fixedly connected to the operating member, and a second end of the pulling member is fixedly connected to the driving member.

Preferably, a guiding structure is formed on the driving member for guidance of the pulling member.

Preferably, the guiding structure is an arc-shaped slot, and the pulling member is partially disposed in the arc-shaped slot.

Preferably, the pulling member is disposed through the backrest tube, the operating member is disposed on a top end of the backrest tube, a hole is formed on the inner cover for allowing the pulling member to pass therethrough, and the first end of the pulling member passes through the hole to be fixedly connected to the operating member.

Preferably, the backrest adjusting mechanism further includes an elastic member connected between the driving member and the outer cover; when the driving member moves from the first position to the second position, the driving member abuts against the elastic member to cause elastic deformation of the elastic member for making the elastic member have a tendency to keep driving the driving member to move to the first position.

Preferably, the inner cover includes a cover board and a connection tube disposed at two sides of the cover board, the cover board covers the accommodating cavity, and the backrest tube is inserted into the connection tube.

Preferably, a cross-sectional shape of the cover board is a circular shape, and a blocking sheet protrudes inward from the outer cover to be cooperated with an outer edge of the cover board.

Preferably, an arc-shaped sheet protrudes from an inner side of the cover board, and the at least one second locking portion is formed on the arc-shaped sheet.

Preferably, an arc-shaped transition structure is formed at a position where the cover board is connected to the connection tube.

Preferably, the at least two first locking portions and the at least one second locking portion are a slot structure respectively.

Preferably, the driving member includes at least one driving slot formed thereon, and the locking member is slidably cooperated with the at least one driving slot.

Preferably, the at least one driving slot is a long arc-shaped slot, a first end of the long arc-shaped slot is close to the pivot shaft, and a second end of the long arc-shaped slot is away from the pivot shaft.

Preferably, the driving member further includes another driving slot, and the at least one driving slot and the another driving slot are adjacent to each other and are curved around the pivot shaft respectively.

Preferably, the locking member includes a sliding pillar slidably cooperated with the at least one driving slot and a lock head selectively locking or releasing the outer cover and the inner cover.

Preferably, when the sliding pillar slide from the first end of the long arc-shaped slot to the second end of the long arc-shaped slot, the lock head locks the outer cover and the inner cover; when the sliding pillar slides from the second end of the long arc-shaped slot to the first end of the long arc-shaped slot, the lock head releases the outer cover and the inner cover.

Preferably, a through slot is formed on the driving member for allowing the lock head to pass therethrough, the through slot is communicated with the at least one driving slot, and the lock head passes through the at least one second locking portion and the corresponding first locking portion after passing through the through slot.

For achieving the aforesaid purposes, an infant carrier of the present invention includes a frame, a backrest tube, and the aforesaid backrest adjusting mechanism, the outer cover is fixed at the frame, and the backrest tube is fixedly connected to the inner cover.

Compared with the prior art, the backrest adjusting mechanism of the present invention utilizes linkage of the operating member, the outer cover, the inner cover, the locking member and the driving member to perform angle adjustment of the backrest tube. That is, via the design that the operating member is connected to the driving member for driving the driving member to move between the first position and the second position and the locking member is movably disposed on the driving member, switching of the driving member between the first position and the second position can selectively lock or release the outer cover and the inner cover. When the driving member moves from the first position to the second position, the outer cover and the inner cover can be released. At this time, a user can push the backrest tube to rotate the inner cover relative to the outer cover for angle adjustment of the backrest tube since the outer cover is pivoted to the inner cover via the pivot shaft and the backrest tube is fixedly connected to the inner cover. When the driving member moves from the second position to the first position, the driving member can drive the locking member to lock the outer cover and the inner cover again for fixing the adjusted angle of the backrest tube. Via the backrest adjusting mechanism, the present invention can solve the problem that the angle of the backrest of the infant carrier commonly seen in the prior art cannot be adjusted. Furthermore, the infant carrier of the present invention has a simple mechanical design and is easy to operate.

These and other objectives of the present invention will no doubt become obvious to those of ordinary skill in the art after reading the following detailed description of the preferred embodiment that is illustrated in the various figures and drawings.

DETAILED DESCRIPTION

The detailed description for preferred embodiments of the present invention is provided with attached drawings as follows.

Figure 1:
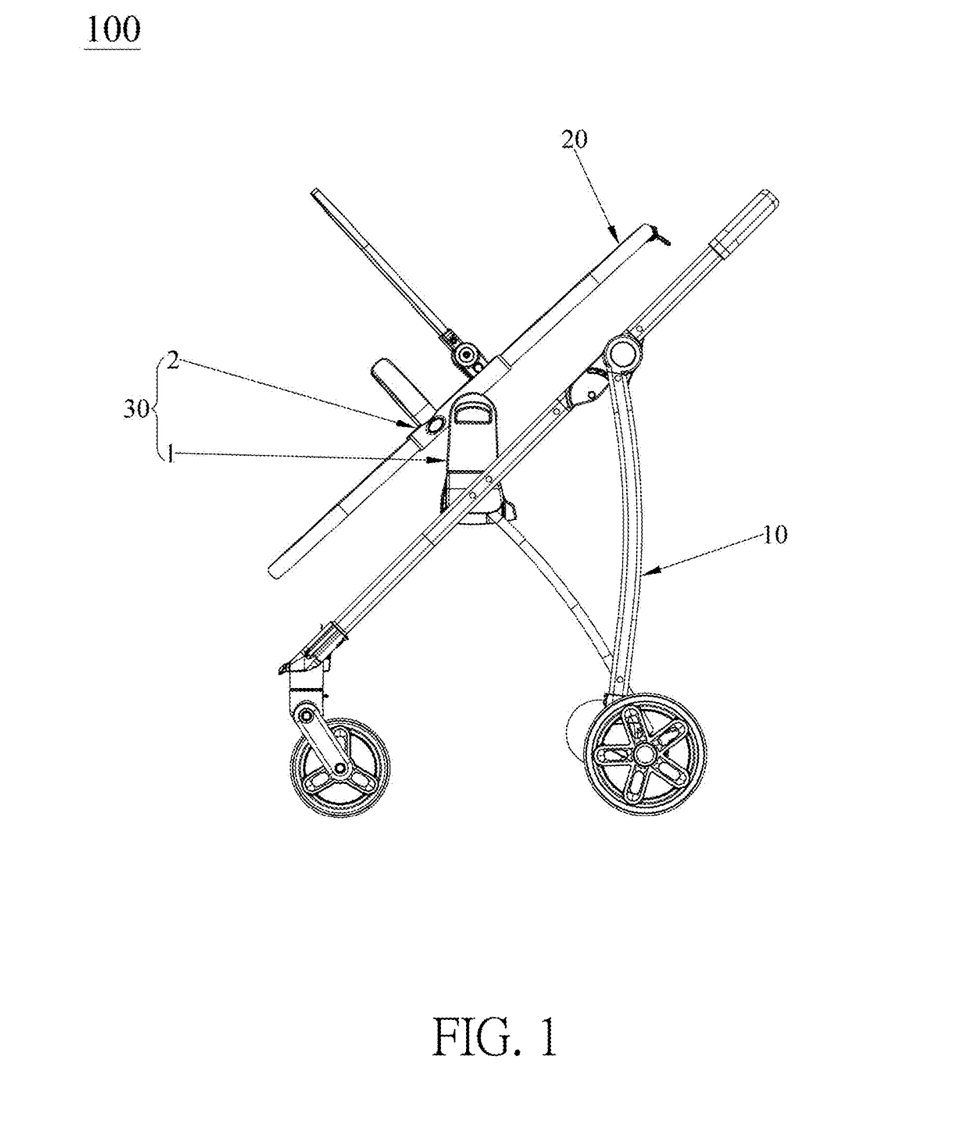
FIG. 1 is a side view of a backrest tube of an infant carrier being adjusted to an angle according to an embodiment of the present invention.
Figure 2:
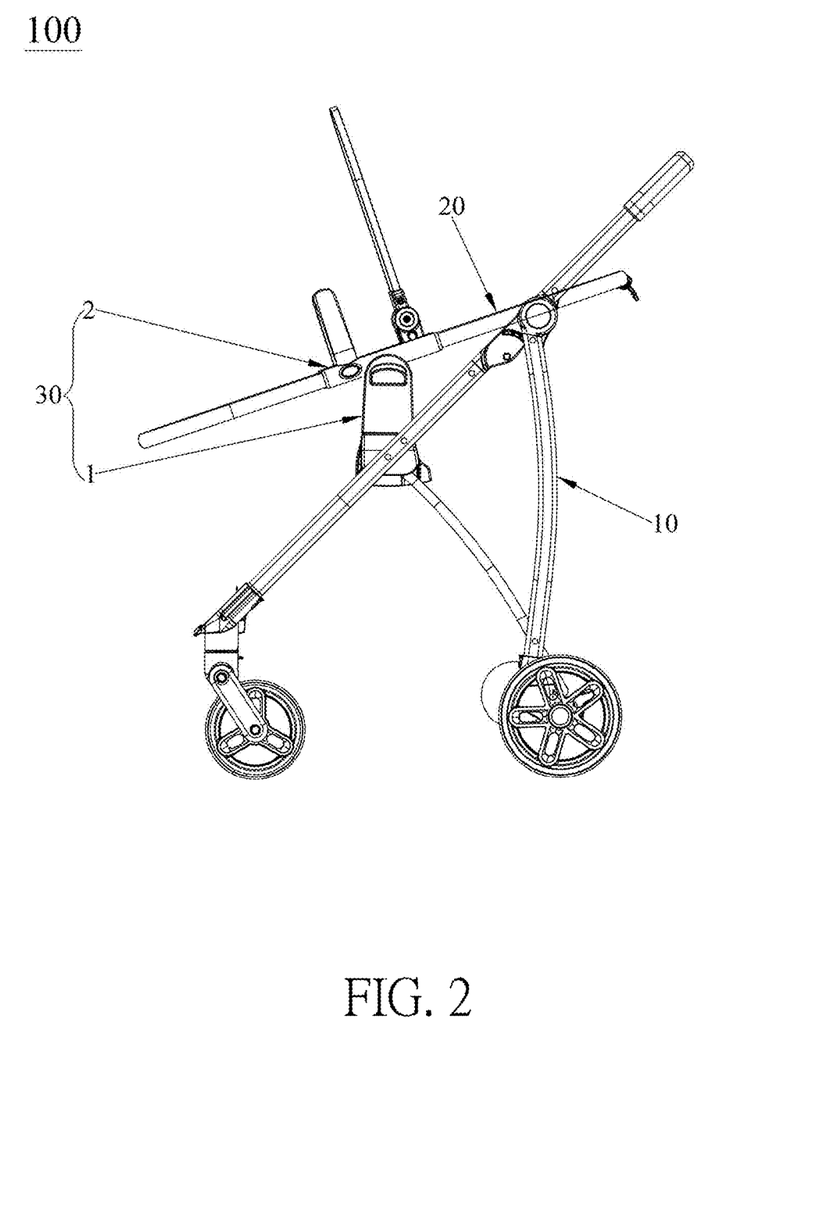
FIG. 2 is a side view of the backrest tube of the infant carrier in FIG. 1 being adjusted to another angle.
Figure 3:
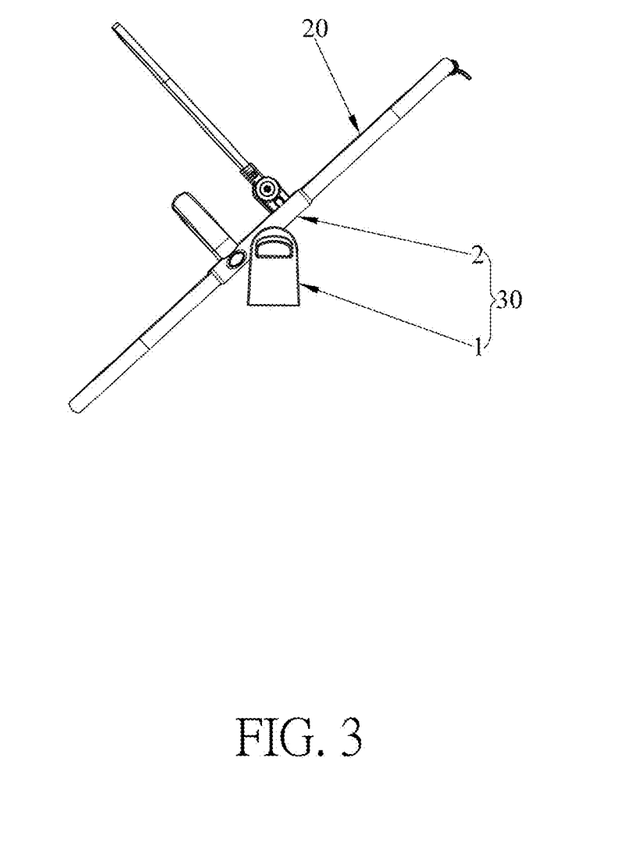
FIG. 3 is a side view of the backrest tube in FIG. 1 being assembled with a backrest adjusting mechanism.
Figure 4:
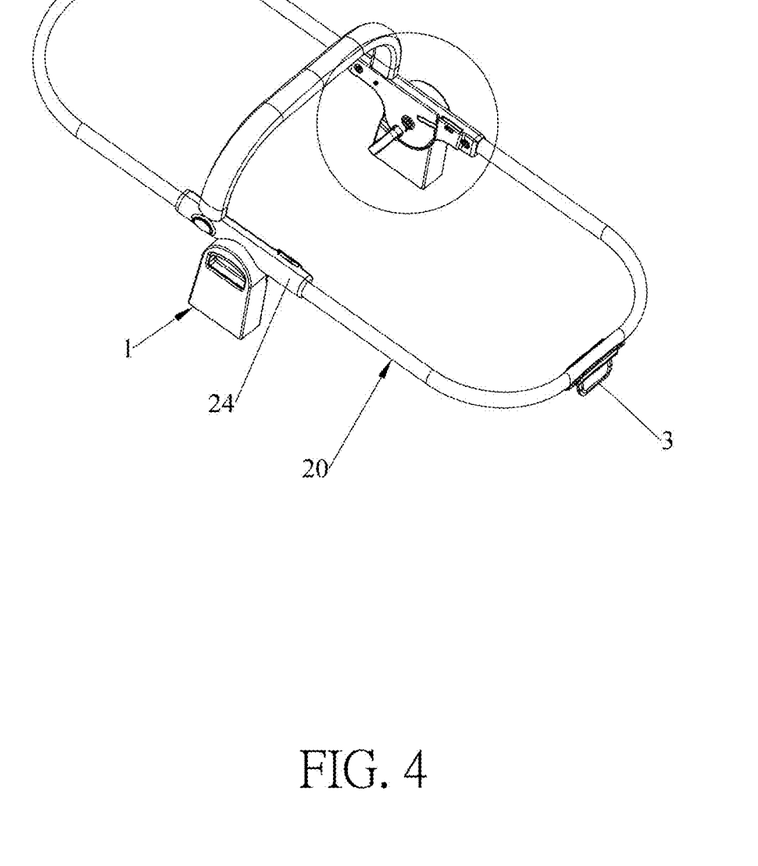
FIG. 4 is a diagram of the backrest tube in FIG. 3 being assembled with the backrest adjusting mechanism.
Figure 4A:
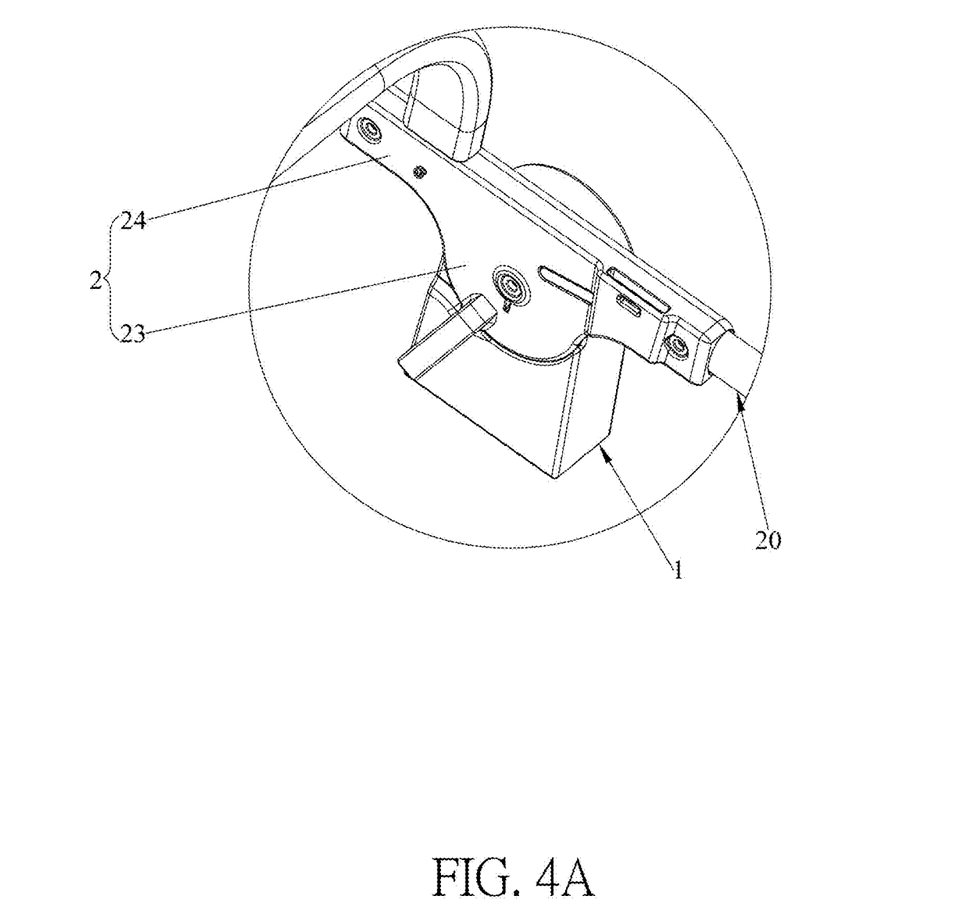
FIG. 4A is a partial enlarged diagram of the backrest tube being assembled with the backrest adjusting mechanism in FIG. 4.

As shown in FIG. 1 and FIG. 2, an infant carrier 100 includes a frame 10, a backrest tube 20 and a backrest adjusting mechanism 30. The backrest tube 20 can be rotatable relative to the frame 10 via the backrest adjusting mechanism 30 for angle adjustment of the backrest tube 20 to make an infant sitting on the infant carrier comfortably when taking the infant out. An end of the backrest adjusting mechanism 30 is fixed at the frame 10, and another end of the backrest adjusting mechanism 30 is fixedly connected to the backrest tube 20. The backrest adjusting mechanism 30 includes an outer cover 1, an inner cover 2, an operating member 3, a locking member 4, and a driving member 5. The outer cover 1 and the inner cover 2 are pivoted to each other via a pivot shaft 6. The driving member 5 is movably disposed between the outer cover 1 and the inner cover 2. The locking member 4 is movably disposed on the driving member 5. The operating member 3 is connected to the driving member 5 for driving the driving member 5 to move between a first position and a second position. Switching of the driving member 5 between the first position and the second position drives the locking member 4 to selectively release or lock the outer cover 1 and the inner cover 2. For example, when the driving member 5 moves from the first position to the second position, the driving member 5 drives the locking member 4 to release the outer cover 1 and the inner cover 2 for making the outer cover 1 rotatable relative to the inner cover 2. On the other hand, when the driving member 5 moves from the second position to the first position, the driving member 5 drives the locking member 4 to lock the outer cover 1 and the inner cover 2 for preventing rotation of the outer cover 1 relative to the inner cover 2. To be more specific, the outer cover 1 is fixed at the frame 10, and the backrest tube 20 is fixedly connected to the inner cover 2. Accordingly, via rotation of the inner cover 2 relative to the outer cover 1, an angle of the backrest tube 20 relative to the frame 10 can be adjustable. An accommodating cavity 11 is formed on the outer cover 1 and has an opening facing inward. The inner cover 2 covers the opening 12. The driving member 5 is located in the accommodating cavity 11. It can be understood that the locking member 4 is movably disposed on the driving member 5. Thus, the locking member 4 is also located in the accommodating cavity 11. Via the design that the driving member 5 and the locking member 4 are located in the accommodating cavity 11, the present invention can prevent the driving member 5 and the locking member 4 from being damaged by external environment, so as to increase the service life of the backrest adjusting mechanism 30 and make the outer appearance of the backrest adjusting mechanism 30 more compact. To be noted, in another embodiment, the outer cover 1 does not have the accommodating cavity 11 formed thereon, meaning that the locking member 4 and the driving member 5 are not located in the accommodating cavity 11. In this embodiment, the driving member 5 is pivoted to the pivot shaft 6 to be movably disposed between the outer cover 1 and the inner cover 2, but not limited thereto, meaning that the present invention could adopt the design in which the driving member 5 is slidably disposed between the outer cover 1 and the inner cover 2 in another embodiment for utilizing the slidable driving member 5 to release or lock the outer cover 1 and the inner cover 2 via the locking member 4.

As shown in FIG. 5, FIG. 5A, FIG. 6, FIG. 7, and FIG. 7A, five first locking portions 13 are disposed on the outer cover 1, and two second locking portions 21 are disposed on the inner cover 2. When the inner cover 2 rotates relative to the outer cover 1, the two second locking portions 21 are selectively aligned with two of the first locking portions 13 for locking the locking member 4 steadily. Preferably, the present invention could adopt the design that the two second locking portions 21 could rotate to correspond to any three adjacent first locking portions 13 (the middle one of the three first locking portions 13 is located between the two second locking portions 21) such that the backrest adjusting mechanism 30 can provide a three-stage angle adjusting function.

Figure 5:
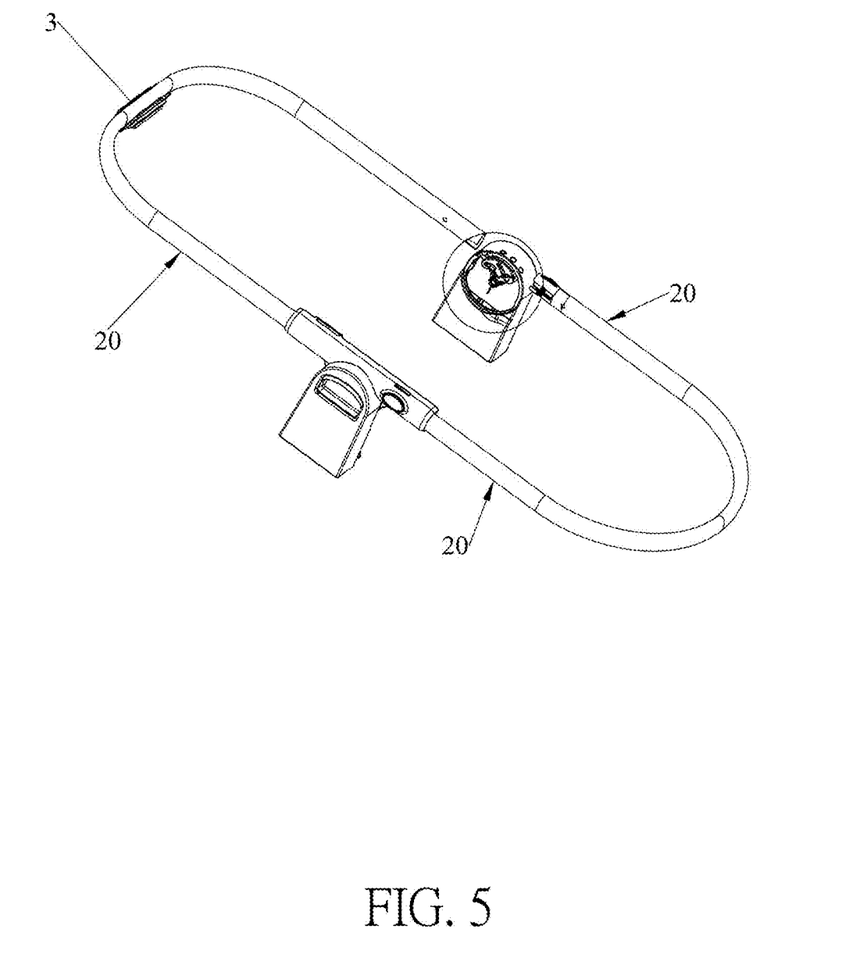
FIG. 5 is a diagram of the backrest adjusting mechanism in FIG. 4 after an inner cover is removed.
Figure 5A:
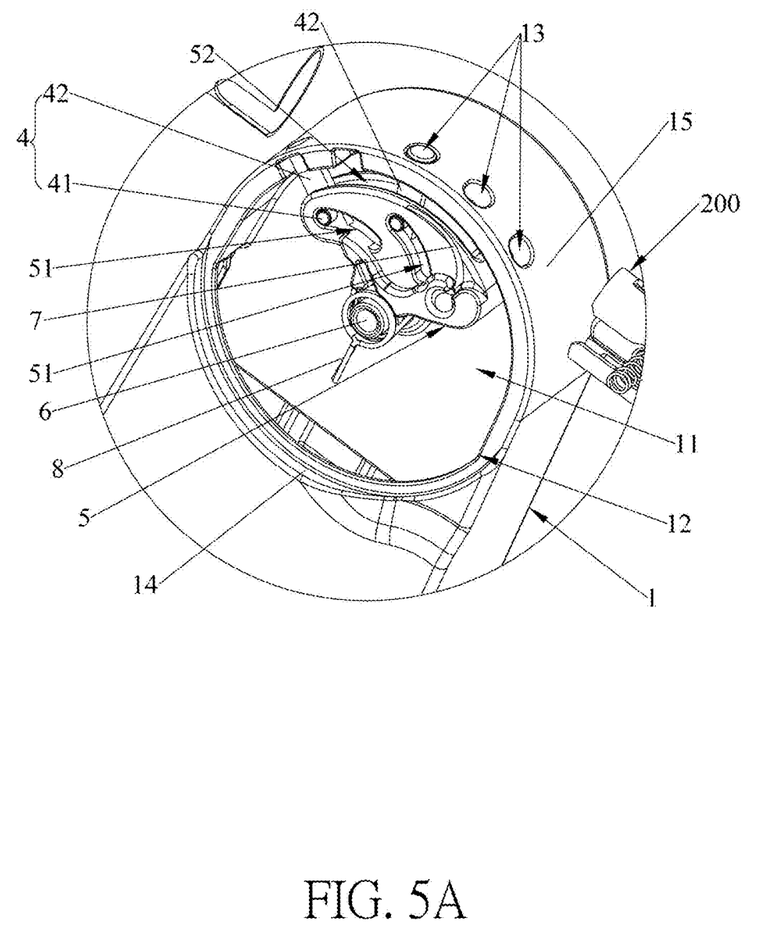
FIG. 5A is a partial enlarged diagram of the backrest adjusting mechanism in FIG. 5.
Figure 6:
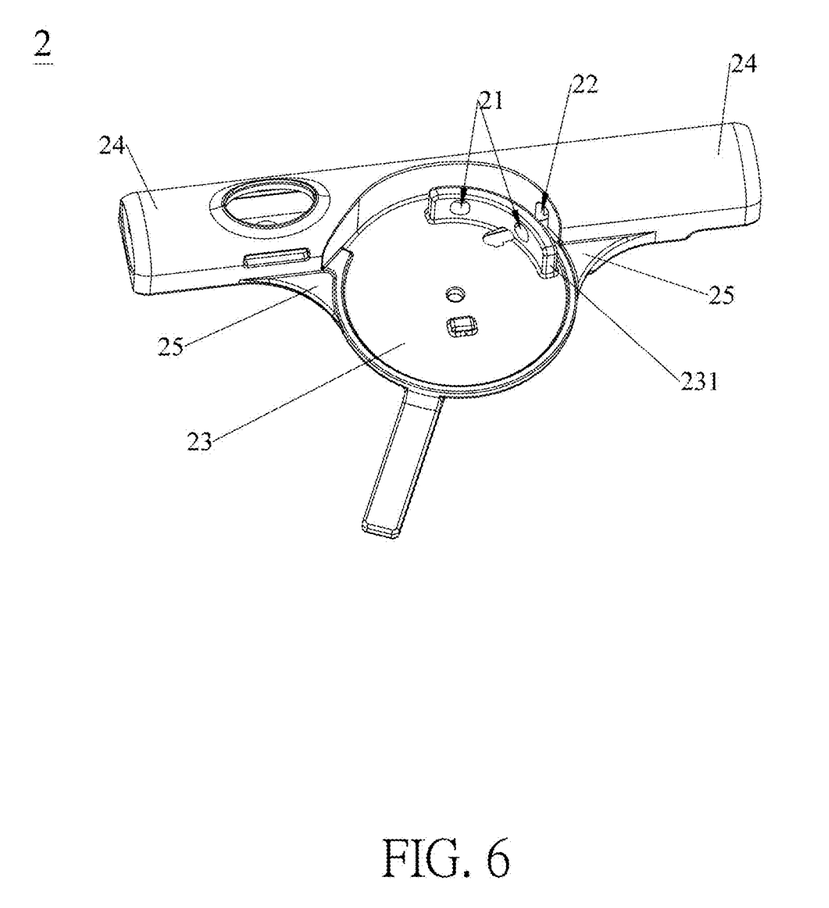
FIG. 6 is a diagram of the inner cover in FIG. 1.
Figure 7:
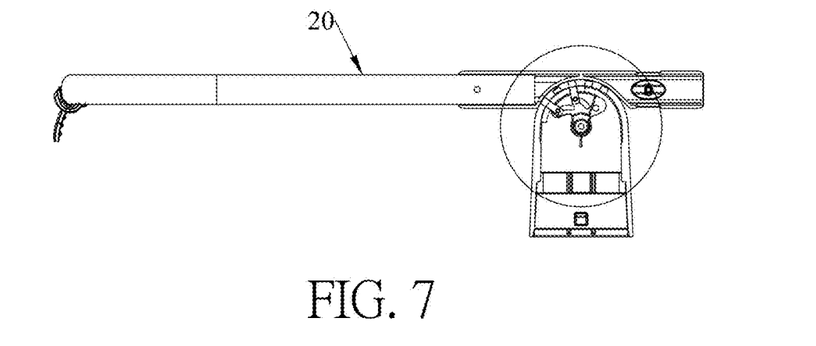
FIG. 7 is a cross-sectional diagram of the backrest adjusting mechanism in FIG. 1.
Figure 7A:
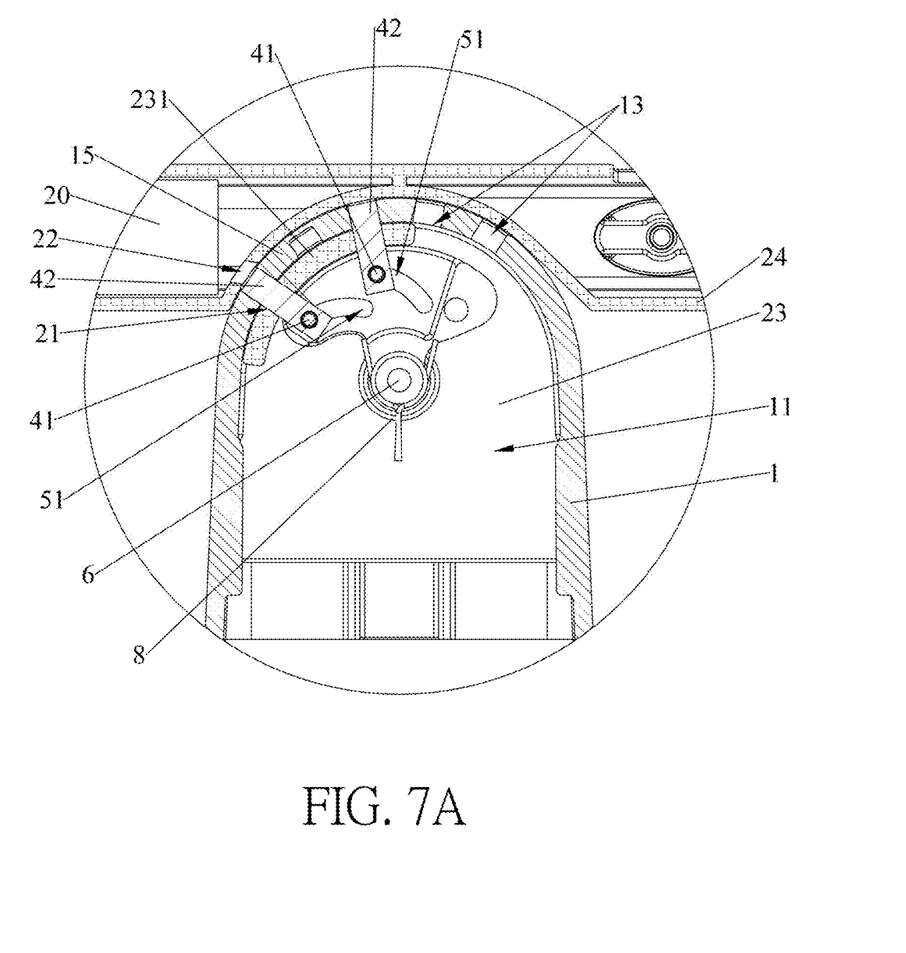
FIG. 7A is a partial enlarged diagram of the backrest adjusting mechanism in FIG. 7.

In another embodiment, the present invention could adopt the design that only one second locking portion 21 is disposed on the outer cover 1 and two, three, or four first locking portions 13 are disposed on the inner cover 2. In such a manner, the second locking member 21 is selectively aligned with one of the first locking portions 13 for locking the locking member 4 such that the backrest adjusting mechanism 30 can provide a two-stage, three-stage, or four-stage angle adjusting function. In summary, the amount of the first locking portion 13 is larger than the amount of the second locking portion 21, and the locking member 4 can be cooperated with the second locking portion 21 and can be selectively cooperated with one of the first locking portions 13. As such, when the locking member 4 is cooperated with the second locking portion 21 and one of the first locking portions 13, the outer cover 1 is unable to rotate relative to the inner cover 2. On the other hand, when the locking member 4 is cooperated with the second locking member 21 but not cooperated with any of the first locking portions 13, the outer cover 1 is rotatable relative to the inner cover 2. In another embodiment, the present invention could adopt the design that the locking member 4 could be cooperated with or detached from the first locking portion 13 and the second locking portion 21 at the same time. To be more specific, in this embodiment, the first locking portion 13 and the second locking portion 21 could be a slot structure respectively such that the locking member 4 could be engaged with the first locking portion 13 and the second locking portion 21. As shown in FIG. 5 and FIG. 7, the driving member 5 has a driving slot 51 formed thereon, and the locking member 4 is slidably disposed in the driving slot 51. The locking member 4 includes a sliding pillar 41 slidably disposed in the driving slot 51 and a locking head 42 selectively engaged with or detached from the second locking portion 21 and the first locking portion 13. In this embodiment, the sliding pillar 41 and the locking head 42 are integrally connected to each other, but not limited thereto, meaning that the present invention could adopt the design in which the sliding pillar 41 are rotatably connected to the locking head 42 in another embodiment. The sliding pillar 41 protrudes from the locking head 42 toward the driving slot 51. The driving member 5 has a through slot 52 to allow the locking head 42 to pass therethrough, and the through slot 52 is communicated with the driving slot 51. The locking head 42 can pass through the second locking portion 21 and the first locking portion 13 after passing through the through slot 52. In this embodiment, the driving slot 51 is a long arc-shaped slot. A first end of the long arc-shaped slot is relatively close to the pivot shaft 6, and a second end of the long arc-shaped slot is relatively away from the pivot shaft 6. The driving slot 51 rotates with rotation of the driving member 5 relative to the outer cover 1 to make the sliding pillar 41 disposed through the driving slot 51 slidable between the first end and the second end of the long arc-shaped slot for selectively locking or releasing the outer cover 1 and the inner cover 2. For example, when the sliding pillar 41 slides from the first end to the second end, the locking head 42 is cooperated with the second locking portion 21 and the first locking portion 13 sequentially to lock the outer cover 1 and the inner cover 2. On the other hand, when the sliding pillar 41 slides from the second end to the first end, the locking head 42 is detached from the first locking portion 13 and the second locking portion 21 sequentially to release the outer cover 1 and the inner cover 2. Preferably, in this embodiment, the long arc-shaped slot is curved toward the pivot shaft 6 to make the locking member 4 cooperated with the first locking portion 13 and the second locking portion 21 more quickly, but not limited thereto. That is, in another embodiment, the long arc-shaped slot could be curved away from the pivot shaft 6. In this embodiment, the backrest adjusting mechanism 30 includes two locking members 4 (but not limited thereto, meaning that the backrest adjusting mechanism 30 could include one locking member 4, three locking members 4, or four locking members 4). The amount of the locking member 4 is equal to the amount of the second locking member 21 and the driving slot 51 respectively, and the locking members 4, the second locking portions 21 and the driving slots 51 are disposed in a one-to-one arrangement. That is, in this embodiment, the backrest adjusting mechanism 30 includes two driving slots 51. The two driving slots 51 are adjacent to each other and are curved around the pivot shaft 6 respectively. As such, each locking member 4 can be cooperated with or detached from the corresponding first locking portion 13 and the corresponding second locking portion 21 precisely during rotation of the driving member 5.

As shown in FIG. 5, FIG. 5A, FIG. 6, FIG. 7, and FIG. 7A, the backrest adjusting mechanism 30 further includes a pulling member 7. A first end of the pulling member 7 is fixedly connected to the operating member 3, and a second end of the pulling member 7 is fixedly connected to the driving member 5. The pulling member 7 is disposed through the backrest tube 20. Accordingly, long distance linkage between the operating member 3 and the driving member 5 can be achieved via the pulling member 7 such that the operating member 3 can be disposed at a position easy to operate. In this embodiment, the operating member 3 is disposed at a top end of the backrest tube 20. The operating member 3 can rotate the driving member 5 via the pulling member 7 for detaching the locking member 4 from the first locking portion 13 to release the outer cover 1 and the inner cover 2. At this time, a user can just operate the backrest tube 20 to rotate the inner cover 2 relative to the outer cover 1 for angle adjustment of the backrest tube 20, so as to simplify the operating process of the backrest adjusting mechanism 30. Thus, the present invention allows the user to complete the release operation and the angle adjusting operation of the backrest adjusting mechanism 30 quickly for improving the angle adjusting efficiency of the backrest adjusting mechanism 30. The inner cover 2 has a hole 22 for allowing the pulling member 7 to pass therethrough. The first end of the pulling member 7 passes through the hole 22 to be fixedly connected to the operating member 3. The driving member 5 has a guiding structure (not shown in the figures) for guiding the pulling member 7. Via the guiding structure, the pulling member 7 can pull the driving member 5 in an accurate direction to ensure rotation of the driving member 5. The guiding structure is an arc-shaped slot, and the pulling member 7 is partially disposed in the arc-shaped slot. Via guidance of the arc-shaped slot, the pulling member 7 can be pulled smoothly for preventing abrasion of the pulling member 7.

As shown in FIG. 5, FIG. 5A, FIG. 6, FIG. 7, and FIG. 7A, the backrest adjusting mechanism 30 further includes an elastic member 8. The elastic member 8 is connected between the driving member 5 and the outer cover 1. The elastic member 8 has a tendency to keep driving the driving member 5 to the first position. That is, the driving member 5 presses the elastic member 8 to cause elastic deformation of the elastic member 8 when moving from the first position to the second position, so as to make the elastic member 8 have the tendency to keep driving the driving member 5 to the first position. Accordingly, when the operating member 3 is released, the elastic member 8 can drive the driving member 5 to return to its original position via elastic force provided by the elastic member 8. The elastic member 8 could be a torsional spring, but not limited thereto.

As shown in FIG. 5, FIG. 5A, FIG. 6, FIG. 7, and FIG. 7A, the backrest adjusting mechanism 30 could be located at two opposite sides of the backrest tube 20 respectively. The backrest adjusting mechanisms 30 located at the two opposite sides of the backrest tube 20 utilize the operating member 3 cooperatively to be connected to the pulling member 7 located at the two opposite sides of the backrest tube 20 respectively. In such a manner, the inner covers 2 located at the two sides of the backrest tube 20 can rotate relative to the outer covers 1 respectively by utilizing the operating member 3 to operate the two pulling members 7 for making angle adjustment of the backrest tube 20 more steady and reliable.

As shown in FIG. 5, FIG. 5A, FIG. 6, FIG. 7, and FIG. 7A, a cross-sectional shape of the accommodating cavity 11 is a circular shape. The inner cover 2 includes a cover board 23 and a connection tube 24 disposed at two sides of the cover board 23. The cover board 23 covers the accommodating cavity 11. The backrest tube 20 is inserted into the connection tube 24. A cross-sectional shape of the cover board 23 is a circular shape. A blocking sheet 14 protrudes inward from the outer cover 1 to be matched with an outer edge of the cover board 23 and is adjacent to the accommodating cavity 11. A contour of the blocking sheet 14 is arc-shaped (specifically semicircular shaped). Accordingly, the blocking sheet 14 can stop the connection tube 22 when the inner cover 2 rotates to abut against the blocking sheet 14 for limiting the rotation range of the inner cover 2 relative to the outer cover 1 to prevent over-rotation of the inner cover 2. An arc-shaped sheet 231 protrudes from an inner side of the cover board 23. The second locking portions 21 are disposed on the arc-shaped sheet 231, and the outer cover 1 has an arc-shaped edge 15. A curvature of the arc-shaped edge 15 is equal to a curvature of the arc-shaped sheet 231, and the first locking portions 13 are disposed along the arc-shaped edge 15. An arc-shaped transition structure 25 is formed at a position where the cover board 23 is connected to the connection tube 22 for preventing the connection tube 24 from being damaged when the connection tube 22 abuts against the blocking sheet 14.

More detailed description for the operations of the infant carrier 100 and the backrest adjusting mechanism 30 is provided as follows according to the attached drawings. When the user wants to adjust the angle of the backrest tube 20, the user just needs to pull the operating member 3 to rotate the driving member 5 to the second position relative to the outer cover 1 via the pulling member 7, so as to detach the locking member 4 from the first locking portion 13. Subsequently, the user can exert force upon the backrest tube 20 to rotate the inner cover 2 fixedly connected to the backrest tube 20 relative to the outer cover 1 for multi-stage angle adjustment of the backrest tube 20. On the other hand, the user can release the operating member 3 to return the driving member 5 to the first position via the elastic member 8 such that the locking member 4 can lock the first locking portion 13 and the second locking portion 21 again for preventing rotation of the inner cover 2 relative to the outer cover 1.

Compared with the prior art, the backrest adjusting mechanism of the present invention utilizes linkage of the operating member 3, the outer cover 1, the inner cover 2, the locking member 4 and the driving member 5 to perform angle adjustment of the backrest tube 20. That is, via the design that the operating member 3 is connected to the driving member 5 for driving the driving member 5 to move between the first position and the second position and the locking member 4 is movably disposed on the driving member 5, switching of the driving member 5 between the first position and the second position can selectively lock or release the outer cover 1 and the inner cover 2. When the driving member 5 moves from the first position to the second position, the sliding pillar 41 can slide from the second end of the driving slot 5 to the first end of the driving slot 5 for releasing the outer cover 1 and the inner cover 2. At this time, the user can push the backrest tube 20 to rotate the inner cover 2 relative to the outer cover 1 for angle adjustment of the backrest tube 20 since the outer cover 1 is pivoted to the inner cover 2 via the pivot shaft 6 and the backrest tube 20 is fixedly connected to the inner cover 2. When the driving member 5 moves from the second position to the first position, the sliding pillar 41 can slide from the first end of the driving slot 5 to the second end of the driving slot 5 such that the driving member 5 can drive the locking member 4 to lock the outer cover 1 and the inner cover 2 again for fixing the adjusted angle of the backrest tube 20. Via the backrest adjusting mechanism 30, the present invention can solve the problem that the angle of the backrest of the infant carrier commonly seen in the prior art cannot be adjusted. Furthermore, the infant carrier 100 of the present invention has a simple mechanical design and is easy to operate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backrest adjusting mechanism disposed between a backrest tube and a frame of an infant carrier, the backrest adjusting mechanism comprising:
   an outer cover fixed at the frame;
   an inner cover connected to the backrest tube and pivoted to the outer cover via a pivot shaft;
   a driving member movably disposed between the outer cover and the inner cover and pivoted to the pivot shaft;
   a locking member movably disposed on the driving member; and
   an operating member connected to the driving member for driving the driving member to move between a first position and a second position, switching of the driving member between the first position and the second position driving the locking member to selectively lock or release the outer cover and the inner cover.

2. The backrest adjusting mechanism of claim 1, wherein an accommodating cavity is formed on the outer cover and has an opening facing inward, the inner cover covers the opening, and the driving member is located in the accommodating cavity.

3. The backrest adjusting mechanism of claim 1, wherein at least two first locking portions are disposed on the outer cover, at least one second locking portion is disposed on the inner cover, and the locking member is cooperated with the at least one second locking portion and selectively cooperated with one of the at least two first locking portions.

4. The backrest adjusting mechanism of claim 1, wherein the backrest adjusting mechanism further comprises a pulling member, a first end of the pulling member is fixedly connected to the operating member, and a second end of the pulling member is fixedly connected to the driving member.

5. The backrest adjusting mechanism of claim 4, wherein a guiding structure is formed on the driving member for guidance of the pulling member.

6. The backrest adjusting mechanism of claim 5, wherein the guiding structure is an arc-shaped slot, and the pulling member is partially disposed in the arc-shaped slot.

7. The backrest adjusting mechanism of claim 4, wherein the pulling member is disposed through the backrest tube, the operating member is disposed on a top end of the backrest tube, a hole is formed on the inner cover for allowing the pulling member to pass therethrough, and the first end of the pulling member passes through the hole to be fixedly connected to the operating member.

8. The backrest adjusting mechanism of claim 1 further comprising:
an elastic member connected between the driving member and the outer cover;
wherein when the driving member moves from the first position to the second position, the driving member abuts against the elastic member to cause elastic deformation of the elastic member for making the elastic member have a tendency to keep driving the driving member to move to the first position.

9. The backrest adjusting mechanism of claim 2, wherein the inner cover comprises a cover board and a connection tube disposed at two sides of the cover board, the cover board covers the accommodating cavity, and the backrest tube is inserted into the connection tube.

10. The backrest adjusting mechanism of claim 9, wherein a cross-sectional shape of the cover board is a circular shape, and a blocking sheet protrudes inward from the outer cover to be cooperated with an outer edge of the cover board.

11. The backrest adjusting mechanism of claim 9, wherein an arc-shaped sheet protrudes from an inner side of the cover board, and the at least one second locking portion is formed on the arc-shaped sheet.

12. The backrest adjusting mechanism of claim 9, wherein an arc-shaped transition structure is formed at a position where the cover board is connected to the connection tube.

13. The backrest adjusting mechanism of claim 3, wherein the at least two first locking portions and the at least one second locking portion are a slot structure respectively.

14. The backrest adjusting mechanism of claim 3, wherein the driving member comprises at least one driving slot formed thereon, and the locking member is slidably cooperated with the at least one driving slot.

15. The backrest adjusting mechanism of claim 14, wherein the at least one driving slot is a long arc-shaped slot, a first end of the long arc-shaped slot is close to the pivot shaft, and a second end of the long arc-shaped slot is away from the pivot shaft.

16. The backrest adjusting mechanism of claim 15, wherein the driving member further comprises another driving slot, and the at least one driving slot and the another driving slot are adjacent to each other and are curved around the pivot shaft respectively.

17. The backrest adjusting mechanism of claim 15, wherein the locking member comprises a sliding pillar slidably cooperated with the at least one driving slot and a lock head selectively locking or releasing the outer cover and the inner cover.

18. The backrest adjusting mechanism of claim 17, wherein when the sliding pillar slide from the first end of the long arc-shaped slot to the second end of the long arc-shaped slot, the lock head locks the outer cover and the inner cover; when the sliding pillar slides from the second end of the long arc-shaped slot to the first end of the long arc-shaped slot, the lock head releases the outer cover and the inner cover.

19. The backrest adjusting mechanism of claim 17, wherein a through slot is formed on the driving member for allowing the lock head to pass therethrough, the through slot is communicated with the at least one driving slot, and the lock head passes through the at least one second locking portion and the corresponding first locking portion after passing through the through slot.

20. An infant carrier comprising:
a frame;
a backrest tube; and
a backrest adjusting mechanism disposed between the backrest tube and the frame, the backrest adjusting mechanism comprising:
an outer cover fixed at the frame;
an inner cover connected to the backrest tube and pivoted to the outer cover via a pivot shaft;
a driving member movably disposed between the outer cover and the inner cover and pivoted to the pivot shaft;
a locking member movably disposed on the driving member; and
an operating member connected to the driving member for driving the driving member to move between a first position and a second position, switching of the driving member between the first position and the second position driving the locking member to selectively lock or release the outer cover and the inner cover.

* * * * *